Patented June 28, 1932

1,865,141

UNITED STATES PATENT OFFICE

ERNST ROTHLIN, OF BASEL, SWITZERLAND, ASSIGNOR TO THE FIRM OF "CHEMICAL WORKS FORMERLY SANDOZ", OF BASEL, SWITZERLAND

MANUFACTURE OF THERAPEUTIC CALCIUM PREPARATIONS

No Drawing. Application filed September 29, 1927, Serial No. 222,946, and in Germany November 26, 1926.

The parenteral administration of calcium salts has hitherto been limited to intravenous injection, as the usual preparations such as calcium chloride combined with urea, mannite sulphonate of calcium and other preparations of this kind are too irritating for the tissues, when given by intramuscular or subcutaneous injection. This restriction to intravenous administration is generally considered as a disadvantage, so that the preparation of a sufficiently concentrated calcium salt solution which can be injected intramuscularly, must be considered as a progress, as by the use of such a solution the parenteral administration of calcium is simplified and extended.

It has been observed that aqueous solutions of calciumgluconate fulfill these requirements. They can be given by intramuscular injection without causing irritation or necrosis. Even the solution of the salt in question alone possesses this surprising property, so that special admixtures are not necessary. Besides lending itself to intramuscular injection, calciumgluconate, when compared with calcium chloride and calcium lactate, possesses the further advantage of a smaller toxicity, calculated on equal calcium contents. This has been proved by intravenous administration to mice and rabbits.

Calciumgluconate is however only soluble in cold water up to about 3%. This solubility would appear to be too low for therapeutic application, as normally 0.5–1 g. of calcium salt should be administered. The salt is only easily soluble in hot water, but crystallizes out again to a greater extent from a concentrated solution when standing in the cold for some time.

Now, it has been found that completely stable preparations are obtained if concentrated, aqueous solutions of calciumgluconate are prepared and introduced in hot state into hermetically closable containers (ampullæ for instance), which are then sealed and heated thereafter, if necessary repeatedly at certain intervals, until no further crystallization takes place. It is surprising to note, that ampullæ thus prepared remain clear even when exposed to the cold, and even when continuously and vigorously shaken as by long transports. The explanation for this is apparently the fact, that when the solutions are heated in a sealed ampulla, all centres of crystallization are destroyed, so that by the above described method a supersaturated solution of unexpected stability is obtained, which crystallizes out only some time after opening the ampulla, or more quickly when the ampulla is scratched or the solution seeded.

Example 100 g. of calciumgluconate are dissolved in 500 ccm. of distilled water on the water bath, allowed to cool down to 15° C. and diluted with distilled water to 1 litre. The solution is then rapidly filtered and heated to 50–60° C. At this temperature the solution is filtered through a sterile Chamberlandfilter (the entire apparatus is previously heated to 50° C.) and then poured into ampullæ in a sterile space in the normal way. After sealing, the ampullæ are heated three times during half an hour, at intervals of 2–3 days, in a current of steam. Ampullæ containing the strongly supersaturated 10% solution of calciumgluconate, thus prepared, have remained clear during many months.

What I claim is:

1. A process for the preparation of supersaturated aqueous solutions of calcium gluconate, comprising the steps of preparing a hot, concentrated calcium gluconate solution, filtering it at 50–60° C., introducing the hot solution into suitable containers and heating same in order to destroy centers of crystallization, after closing, repeatedly by intervals at a temperature of 70–100° C., until on cooling and vigorously shaking the solutions remain clear.

2. A process for the preparation of supersaturated aqueous solutions of calcium gluconate, comprising the steps of preparing a hot, concentrated calcium gluconate solution, filtering it at 50–60° C., introducing the hot solution into suitable containers and heating same in order to destroy centers of crystallization, after closing, three times for two hours at intervals of two days, at a temperature of 70-100° C.

3. As new compositions of matter, clear, stable, sterile and supersaturated aqueous calcium gluconate solutions, containing 4-10% of calcium gluconate, which possess excellent therapeutical properties and may be used for intramuscular injections free from irritation of the tissues.

In witness whereof I have hereunto signed my name this 19th day of September, 1927.

ERNST ROTHLIN.